INVENTOR.
HUNTER P. BARKER
BY
MARCH, LeFEVER & WYATT
ATTORNEYS

Sept. 28, 1971  H. P. BARKER  3,608,457
PHOTOGRAPHIC APPARATUS
Filed July 10, 1969  4 Sheets-Sheet 4

INVENTOR.
HUNTER P. BARKER
BY
MARCH, LeFEVER & WYATT
ATTORNEYS 3,608,457
PHOTOGRAPHIC APPARATUS
Hunter P. Barker, Larchmont, N.Y., assignor to
Commercial Decal, Inc., Mount Vernon, N.Y.
Filed July 10, 1969, Ser. No. 840,659
Int. Cl. G03b 35/08
U.S. Cl. 95—18                              7 Claims

ABSTRACT OF THE DISCLOSURE

A novel three-dimensional photographic apparatus which is light, compact and readily portable to a photographic location. The device comprises a camera and a mounting therefor, the mounting being designed to move the camera through an arc of a continuous radius while maintaining the optical axis of the camera lens at all times perpendicular to the vertical axis of the film.

The camera is mounted on a carriage which is in turn mounted pivotally on a carriage mount which is linked by a series of lever arms to a supporting platform such that when moved through an arcuate path, the camera remains centered on its focus object throughout the movement. The linking means also maintains the optical axis of the camera lens perpendicular to the film throughout its arcuate movement on the supporting platform.

DESCRIPTION OF THE INVENTION

This invention relates to three-dimensional photography.

Particularly the invention relates to photographic cameras which are adapted for three-dimensional photography and the mounting mechanism therefor.

More particularly the invention relates to a novel apparatus for three-dimensional photography which is completely portable, light and can be readily disassembled, carried to the desired photographic object and quickly and efficiently reassembled for use.

A three-dimensional photographic image may be described broadly as a composite image containing interlineated views of an object field as seen from a plurality of points of view. More specifically a three-dimensional or lenticular image is a composite image composed of a plurality of lineated panels, different panels representing different portions of the object field on which the camera is focussed; a single panel of the plurality of lineated panels containing a lineated image of a single portion of said object field as seen from a plurality of points of view. Generally speaking any portion of the object field lying in the principal plane on which the camera is focussed will be recorded in only one panel of the lineated image while portions lying in planes further removed from the principal plane, or plane of focus, will be recorded in more than one of the lineated panels.

The art of three-dimensional photography has been well developed in recent years and a number of devices have been developed for producing lineated images by moving the camera in an arc about a chosen point in the object field. The usual film in the camera is exposed through a lenticular screen which is immediately adjacent to the sensitive plate or film and the lenticular screen in the film is moved relative to each other during the movement of the camera through its arc. The length of travel of the camera film with respect to the lenticular screen is normally coordinated so that adjacent lineated panels just touch adjacent panels without overlapping.

It is to be seen that arrangements for the coordinated movement of the lenticular screen with respect to the sensitive film calls for highly complicated equipment and the resulting apparatus is normally bulky and complicated such that it has been further advantageous to bring the object field to be photographed to the studio where the camera is installed with the concominant limitation upon the three-dimensional photography. With the instant invention there is provided a photographic apparatus which obviates the above enumerated objection in that the apparatus is simple in construction, light and thereby easily portable from one location to another.

It is a further object of the invention to provide a three-dimensional photographic apparatus which is simple in construction and which is automatic in its operational techniques after preliminary adjustments are made.

A still further object of the invention is to provide a three-dimensional photographic apparatus which has a high degree of flexibility with respect to the photographing range, that is, with respect to the distance of the object field from the camera itself.

Another object of the invention is to provide a three-dimensional photographic camera and mounting therefor which moves automatically and at a constant speed through the desired arcuate path.

Another object of the invention is to provide a three-dimensional photographic apparatus which maintains the optical axis of the camera lens perpendicular to the vertical axis of the camera film at all times during movement along the desired arcuate path.

Another object of the invention is to provide such an apparatus with automatic opening and shutting of the camera lens shutter at the desired points along the arcuate movement of the camera.

Other and still further objects of the invention will become apparent to those skilled in the art as the description proceeds.

DETAILED DESCRIPTION OF INVENTION

The improved apparatus of this invention comprises the usual camera with which the art is familiar and which comprises essentially a lens equipped with the usual shutter mechanism and held in a lens mounting frame, a bellows arrangement for shielding the film from extraneous light and a film holder adapted to receive the inserted film clip containing the usual photographic film or sensitive plate, a lenticular screen interposed closely adjacent to said sensitive film and the usual cover for both the lenticular screen and the sensitive film.

The camera proper is mounted on a camera carriage which is equipped with some form of focussing mechanism to enable the object image to be focussed at the proper point on the sensitized film by moving the lens closer to or further from the film. A normal arrangement of a serrated track or a track operating upon friction principles with a locking mechanism may be used.

The camera carriage on which the camera is mounted, normally in fixed relation with the exception of the lens frame, is mounted on a camera carriage mounting device such that the camera carriage is free to pivot about a point which is normally toward the rear of the camera carriage. Thus, the camera carriage is adapted to the camea carriage mounting at one pivot point and is free to swivel about this point in a manner to be described below.

The camera carriage mount rests upon and is supported by a supporting platform and is linked to the supporting platform by means of two lever arms extending from the rear of the camera carriage mount where they are pivotally attached to the front of the supporting platform where they are also pivotally attached. The two attaching lever arms or linking means thus allow the camera carriage mount, the camera carriage, and the camera to be swung in an arcuate path upon the supporting platform. Friction reducing means is interposed between the bottom side of the camera carriage mount and the supporting platform and may take the form of roller bearings, small wheels, or any other device known to the art for reducing friction and allowing the arcuate movement to occur without undue resistance.

A third lever arm or linking means is pivotally attached to the front of the supporting platform and to the rear and one side of the camera carriage. This lever arm controls the camera carriage during its arcuate movement so that the sensitive film is maintained in a plane whose vertical axis is perpendicular to the line from the principal object through the lens and to the camera film. This movement is brought about by virtue of the linking means causing the camera carriage to pivot about its pivotal point of attachment to the camera carriage mount as it swings through its arcuate path.

The supporting platform is attached by means of adjusting mechanism to the normal camera tripod stand to permit universal adjustment of the supporting platform with respect to either height or direction in relation to the object being photographed. These tripod adjusting means are those which are standard in the industry and form no part of the inventive concept.

In order to diversify the object distances for which the camera may be used the forward pivotal attachment of the three lever arms described above may be adjusted in an arcuate path which effectively increases or decreases the radius of the arcuate movement of the camera. The two-lever arms which attach the supporting platform to the camera carriage mount are normally adapted to be adjusted with the same adjusting mechanism whereas the third lever arm which links the camera carriage with the supporting platform is adjusted along its forward pivotal point in an arc with a separate adjustment.

The apparatus of the invention is provided with a means for moving the camera on its arcuate traverse at a continuous rate. These camera moving means may be any of the methods with which the art is familiar, such as a continuous connection such as a cord running from one side of the camera carriage through a pulley mechanism around the spindle of a constant speed electric motor through a pulley on the opposite side of the supporting platform and back to the other side of the camera carriage. When the motor is in operation the cord is wound in one direction and the camera is pulled through its arcuate traverse.

The supporting platform is also equipped with a pair of electrical switches. These switches are adjustable with respect to the distance between them. The switches are designed so that they are electrically connected to or make and break an electric circuit which operates the camera shutter. One of the switches opens the shutter and the other closes it so that, given a constant rate of movement of the camera and its mounting means, there is a direct relationship between the distance the two switches are apart and the time of exposure of the film. The switches make contact and complete an electrical circuit with a corresponding triggering device that is disposed on the camera carriage mounting means which is electrically connected to the shutter tripping mechanism in a manner known to the art.

The camera and its mounting means is actuated through its arcuate path by means of a propelling mechanism which may be adapted to suit the particular circumstances of the required movement.

In one embodiment of the invention a constant speed electric motor is mounted on the levers or underneath side of the supporting platform. This constant speed motor is equipped with a variable speed drive mechanism adapted to the driving mechanism by a connecting means such as a cord or the like which is in turn attached to each side of the camera carriage, normally through a pulley which is set into the edges of the supporting platform. Thus when the motor is in operating and the connecting cord attached to the camera carriage the cord is wound on a spindle and the force transferred to the camera carriage. Normally the electrical switch which crosses the camera shutter also breaks the electrical circuit causing the operation of the constant speed motor and the movement of the camera along its arcuate path to stop.

DESCRIPTION OF THE DRAWINGS

The invention will be more clearly explained by reference to the drawings in which.

Figure 1:
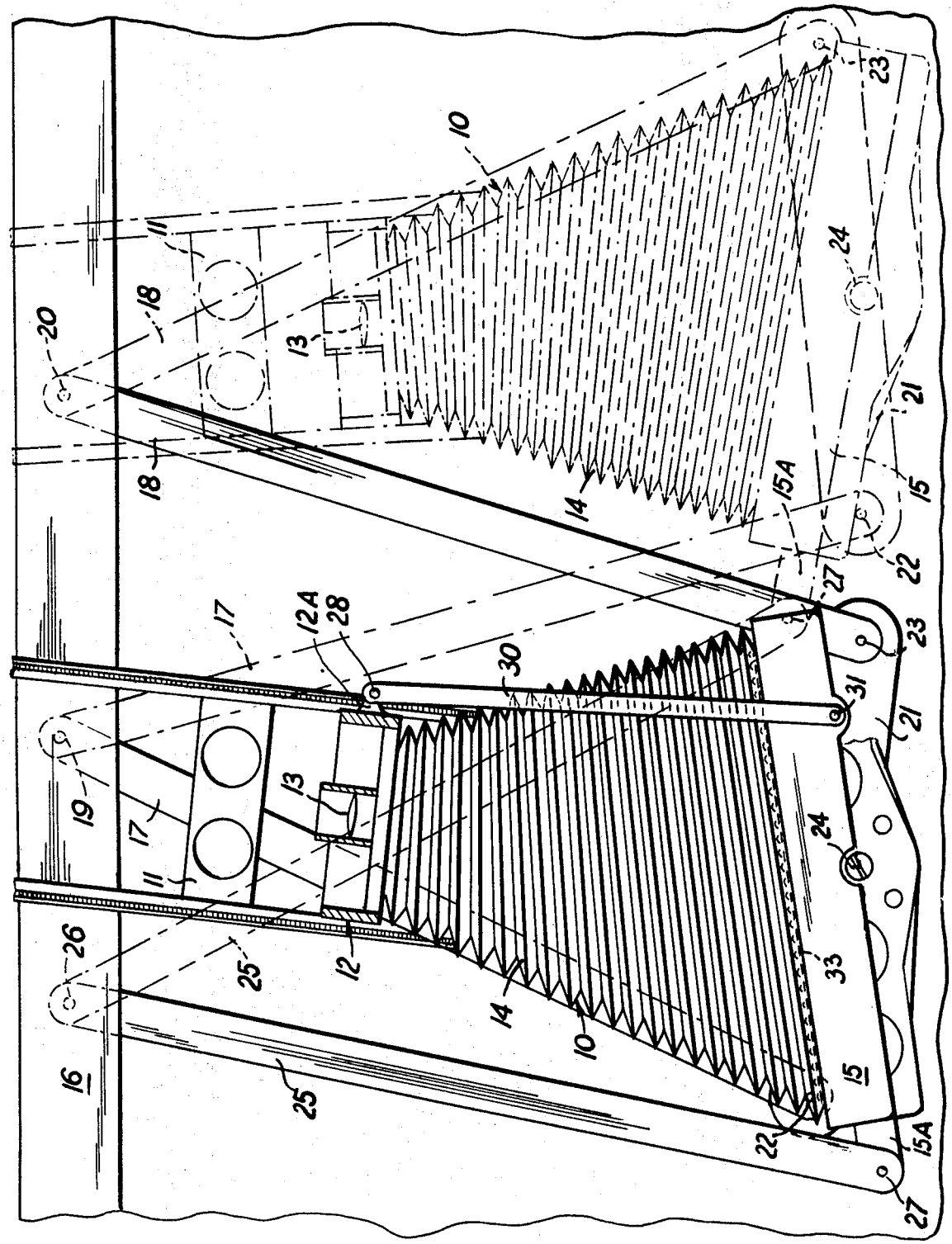
FIG. 1 is a fragmentary plan view of one embodiment of the apparatus of this invention showing the camera in position and showing in solid lines the position of apparatus at the beginning of its arcuate movement and in dotted lines the apparatus at the end of its arcuate path.

Turning now to the drawings, and with special reference to FIG. 1, numeral 10 indicates a camera mechanism which is supported by camera carriage 11. The camera is provided with a lens board or lens holding means 12 with a lens 13 mounted therein. Lens 13 is provided with a shutter mechanism which is adapted to be electrically controlled and the shutter mechanism and the shutter controlling means, which are not shown, may be any of the well-known shutter mechanisms with which the art is familiar.

Bellows 14 represents the ordinary type of camera bellows adapted to exclude extraneous light from the camera per se and is attached to the lens holding means 12 and, at an end remote from lens holding means, to the back 15 of the camera in a known manner.

Back 15 is equipped with the usual film holding means which is adapted to position a sensitive film and in immediate proximity thereto a lenticular screen with the usual film holding plate cover adapted to exclude light from the film until the apparatus is adjusted in position and ready to become operative. The film holding means, the sensitive film, the lenticular screen, are represented graphically at 33, but since these devices are well-known in the art they are not shown in detail.

The camera 10 and the camera carriage 11 are attached to a camera carriage mounting means 21. The camera carriage is attached to a camera carriage mounting means 21 by means of pivoting means 24. The camera carriage mount 21 is in turn attached to supporting platform 16 by means of lever arms 17 and 18. Lever arm 17 is attached to supporting platform 16 at the forward end thereof by means of pivot 19. Lever arm 18 is attached to supporting platform 16 at the forward end thereof by means of pivot 20. The opposite or rear ends of lever arms 17 and 18 are attached to the camera carriage mount by means of pivots 22 and 23, respectively.

A third lever arm 25 is attached to supporting platform 16 at the forward end thereof by means of pivot 26. The opposite end of lever 25 is attached to an extension 15A of the back 15 of the camera by means of pivot 27.

In the embodiment shown in FIG. 1 the lens board or lens holding means 12 has an extension 12A which is connected by means of pivot 28 to lever 30. The other end of lever 30 is attached to the back 15 of camera 10 by means of pivot 31. The length of lever 30 is adjusted so as to maintain the optical axis of lens 13 substantially perpendicular to the sensitive film in the back 15 of the camera throughout any arcuate movement thereof.

In the operation of the embodiment shown in FIG. 1 camera 10 is focussed on an object by traverse movement of lens holding means 12 along camera carriage 11 until the image of the object is exactly in focus on the surface of the sensitive film at the back of the camera. Normally this focussing operating is done with the camera in the center of its arcuate path. The camera and its mounting means is moved to its initial starting position as shown in this embodiment in solid lines at the left-hand side of the drawing. The camera and its mounting apparatus is then moved to the right from its initial starting position by being swung about pivots 19 and 20 along an arcuate path upon supporting platform 16. During the arcuate movement lever arm 25 is moved and causes the back 15 to swing about its pivot 24 until it reaches the position shown to the right of the drawing in the dotted lines. Lever 30 by virtue of its pivotal attachment at 31 and 28 maintains the optical axis of lens 13 at all times perpendicular to the vertical axis of the film in the back 15 of the camera. During the arcuate movement and for the desired period of time the shutter mechanism positioned between the object and lens 13 is opened, thus permitting the image to be recorded on the sensitive film through the lenticular screen, which is positioned between the film and the lens. The use of the lenticular superimposed immediately adjacent to sensitive film creates the plurality of lineated panels immediately behind each single lenticular of the screen, as was explained above, different lineated panels representing different portions of the object field on which the camera is focussed and resulting in the desired three-dimensional photograph.

Figure 2:
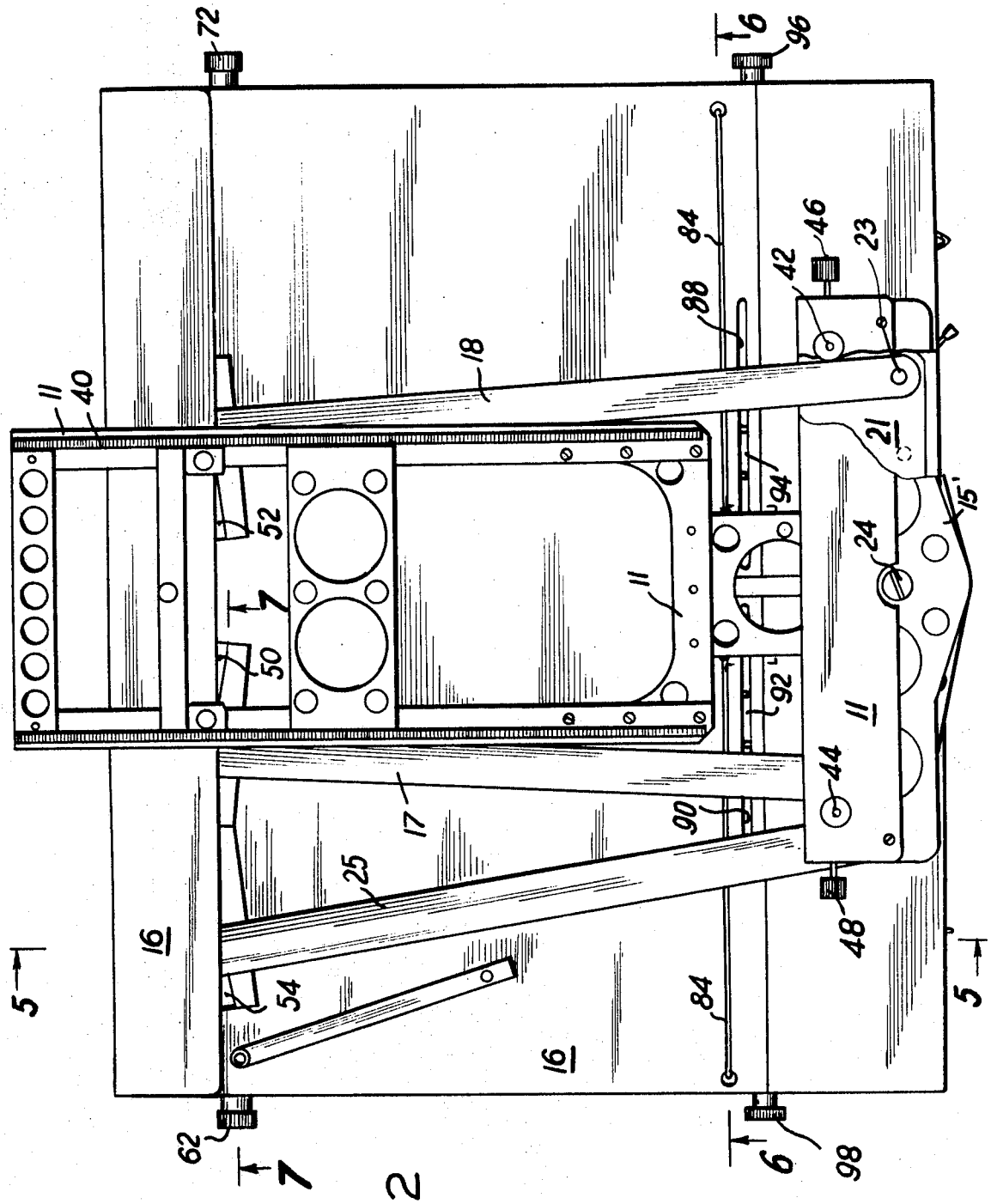
FIG. 2 is a plan view of another embodiment of the invention showing in more detail a preferred embodiment.

Turning now to another embodiment of the invention and with particular reference to FIG. 2 there is shown in top plan view the apparatus with the camera removed. Reference numeral 40 indicates a serrated track by means of which lens holding means 12 may be moved for the focussing of the camera when it is in position. The rear of the camera, that is to say, film board 15, is normally attached to the camera carriage by the use of screws in back 15 operating in screw threaded receiving means 42 and 44. Knurled knobs 46 and 48 anchor the back of camera 15 in position on camera carriage 11.

In the embodiment shown in FIGS. 2 through 8, the forward ends of lever arms 17, 18 and 25 are attached to adjustable pivot points 19, 20 and 26, respectively, which are adapted to be adjusted in arcuate slots 50, 52 and 54. As was explained above, the adjustment of the forward end pivots of the lever arms lends to the utility of the apparatus of the invention since these adjustments enable the camera to be focussed on image objects in an infinite number of positions.

Figure 6:
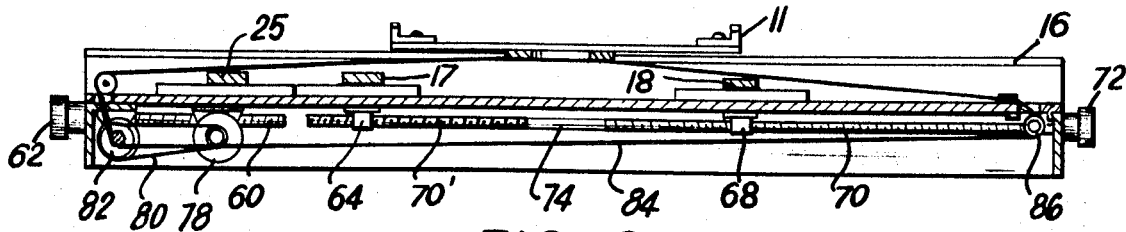
FIG. 6 is a view in cross section taken along the lines 6—6 of FIG. 2.
Figure 7:
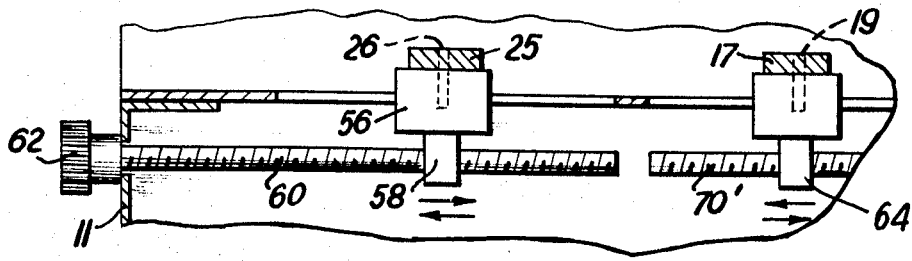
FIG. 7 is a partial cross section taken along the lines 7—7 of FIG. 2.
Figure 8:
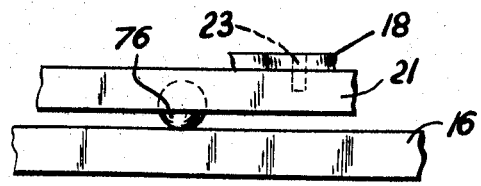
FIG. 8 is an enlarged view of one portion of apparatus showing in more detail one embodiment of a roller mechanism used to reduce friction as the camera and its mounting mechanism moves across the supporting platform.

The mechanisms by which this arcuate adjustment is accomplished is shown in more detail in FIGS. 6 and 7.

Turning specifically to FIG. 7, there is shown the forward end of lever arm 25 operating about its pivot 26. Pivot 26 is an integral part of lever arm 25 and is adapted to be inserted in a pivoting block 56. As an integral part of pivoting block 56 a threaded nut 58 is adapted to co-operate with threaded rod 60 which is actuated by knurled knob 62. When knob 62 is rotated it in turn rotates threaded rod 60 and by co-action with nut 58 pivot block 56 is moved along rod 60 according to the direction of rotation. This effectively moves pivot 26 and the forward end of lever arm 25 in the desired direction. With respect to the forward ends of lever arms 17 and 18 a similar arrangement is provided by means of threaded nuts 64 and 68, which operate in conjunction with threaded rod 70. In this instance, however, threaded rod 70 actuated by means of knurled knob 72 contains two separate threaded portions divided by an unthreaded portion shown at 74. This arrangement is provided so that when knurled knob 72 is turned in one direction the threaded nuts 64 and 68 move in opposite directions either bringing the forward ends of lever arms 17 and 18 together uniformly or apart by the same amount. Thus, by a rotation in one direction of knurled knob 72 the upward ends of lever arms 17 and 18 are simultaneously brought nearer together or extended further apart, which effectively decreases or increases the radius of the arcuate movement of the camera carriage mounting means about the focal point of the object being photographed. A concomitant adjustment of the forward end of lever arm 25 by means of knurled knob 62 effectively controls the movement of the back of the camera such that the desired lineated panel is obtained on the sensitive film without overlap and without undesirable spacing.

As was stated above the camera carriage mounting means moves in an arcuate path upon supporting platform 16. Frictional contact between mounting means 21 and the supporting platform 16 is reduced by methods known to the art and in the embodiment shown in FIG. 8 by a recessed ball bearing 76, which is fixed in mounting means 21 and results in point contact with supporting platform 16.

Figure 3:
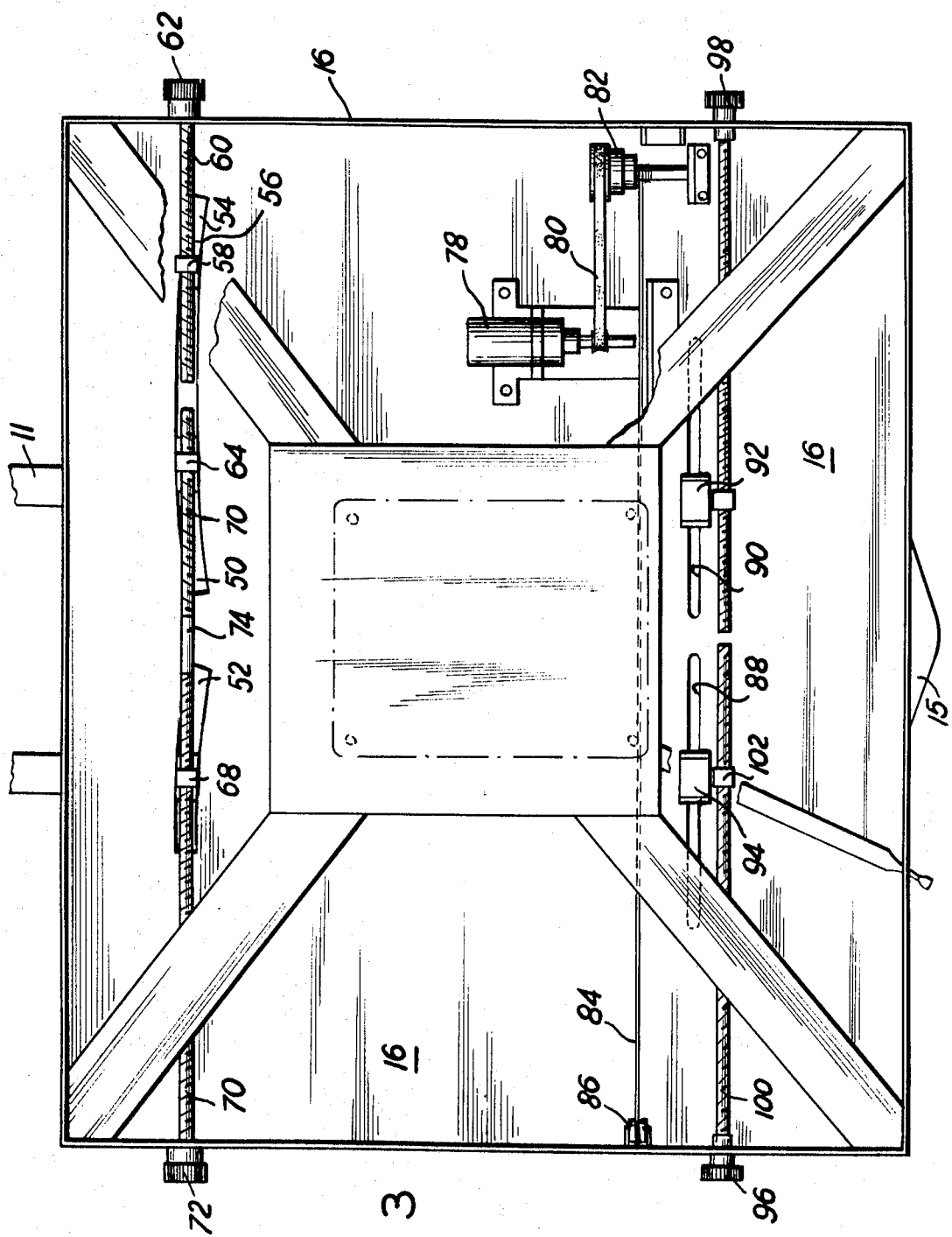
FIG. 3 is a plan view of the underneath side of the apparatus of FIG. 2.
Figure 4:
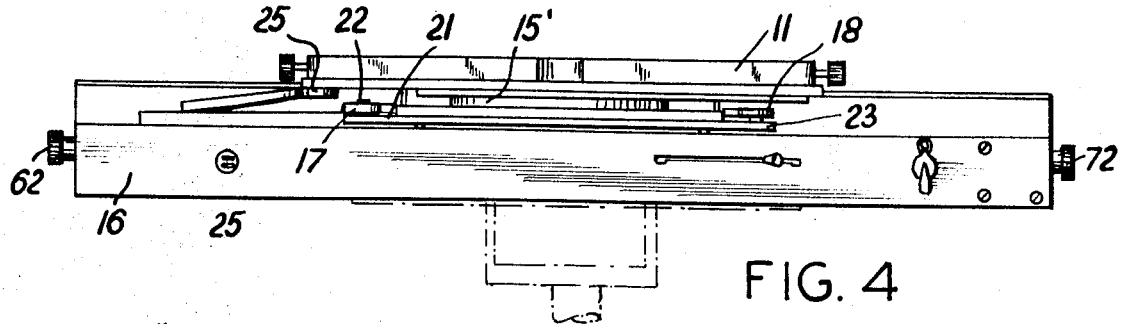
FIG. 4 is an end view of the apparatus of FIG. 2.
Figure 5:
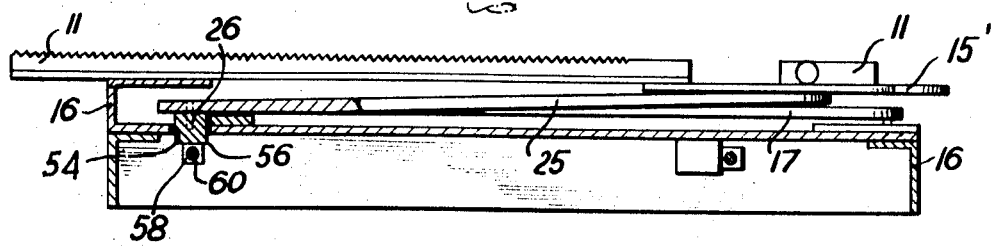
FIG. 5 is a view in cross section of the apparatus taken along the lines 5—5 of FIG. 2.

The camera carriage mounting means, the camera carriage and the camera 10 are moved throughout the arcuate path in the embodiment shown in FIG. 3 by means of a variable speed electrical motor 78, which drives by means of a belt 80 a variable speed drive 82. Wound around a spindle of variable speed drive 82 is a connecting means such as cord 84 which passes through a frictional reducing mechanism such as pulley 86 and is attached to opposite sides of carriage 11 as shown in FIG. 2. Rotation of variable speed drive 82 causes cord 84 to wind in the desired direction, thus moving the camera through its desired arcuate path.

In order to obtain the desired three-dimensional photograph the sensitive film must be exposed throughout a portion of the movement of the camera about the focal point of the object image for the desired period of time. In the embodiment of this invention shown in FIGS. 2–8 this exposure is brought about by means of a pair of electrical switches which are movably disposed, as shown in FIG. 3, along slots 88 and 90 in supporting platform 16. Switches 92 and 94 extend upwardly through slots 88 and 90, shown from the top in FIG. 2, and are adjusted either closer together or further apart by means of rotation of knurled knobs 96 and 98. Rotation of knurled knob 96 revolves threaded rod 100, which moves threaded nut 102 along threaded rod 100, thus moving switch 94 along slot 88. The closer switches 92 and 94 are positioned the shorter the exposure time, and vice versa. The switches are electrically connected to the shutter mechanism previously described and actuate the electrical circuit by means of contacting a switching mechanism on the underneath side of camera mounting means 21. In the preferred embodiment of the invention switch 94 operates to both close the camera shutter and to break the electrical circuit which operates variable speed motor 78 and thus stopping the arcuate movement of the camera as well.

To summarize briefly, the instant invention relates to a novel three-dimensional photographic apparatus which is light, compact and readily portable to a photographic location. The apparatus comprises the usual 3-D camera mounted upon a camera carriage which is in turn mounted on a camera carriage mounting means such that the camera and the camera carriage is free to pivot on the mounting device. A pair of lever arms attach the camera carriage mounting means to a supporting platform so that the camera, the camera carriage and the camera carriage mounting means are free to pivot about an object in an arcuate path. The back of the camera is connected to a supporting platform by means of a third lever arm and is adapted to maintain the vertical axis of the back of the camera perpendicular to the object image throughout its arcuate movement. The forward ends of all three lever arms are adjustable in an arcuate path so that the camera may be focussed upon an object image at varying distances from the camera lens.

The device is provided with automatic means for moving the camera throughout its arcuate path and means for automatically opening and closing the shutter of the camera for the desired time as it moves along its arcuate path.

What is claimed is:

1. An apparatus for three-dimensional photography which comprises:
   a camera including means to record lenticular images;
   carriage means upon which said camera is mounted;
   mounting means for said carriage means pivotally connected thereto;
   a supporting platform for said carriage mounting means;
   said carriage means and said carriage mounting means adapted to be moved in an arcuate manner on said supporting platform;
   means pivotally linking said carriage mounting means to said supporting means;
   said linking means being adapted such that when said carriage means and said carriage mounting means are moved arcuately, said carriage means maintains said camera aimed at an original focus point throughout said arcuate movement.

2. An apparatus according to claim 1 wherein said linking means are adjustably connected to said supporting platform.

3. An apparatus according to claim 1 wherein said linking means are arcuately adjustably connected to said supporting platform.

4. An apparatus according to claim 1 wherein said supporting platform is provided with a pair of adjustable electrically operated switch means adapted to open and close an electrical circuit to operate the camera shutter when contracted.

5. An apparatus for three-dimensionally photography which comprises:
   a camera adapted to record lenticular images;
   carriage means upon which said camera is mounted provided with means for focussing said camera on an object;
   carriage mounting means upon which said carriage means is pivotally mounted;
   a supporting platform for said carriage mounting means;
   said carriage mounting means linked to said supporting platform by two lever arms pivotally attached to both said carriage mounting means and said supporting platform;
   said carriage means linked to said supporting platform by one lever arm pivotally attached to both said supporting platform and said carriage means;
   said supporting platform equipped with a pair of switching means electrically connected to a power source and adapted to complete and interrupt an electrical circuit opening and closing the shutter of said camera;
   said supporting platform also equipped with means to move said camera, said camera carriage and said carriage mounting means along an arcuate path on said supporting platform at a constant rate.

6. An apparatus according to claim 5 wherein said carriage means linking arm and said carriage mounting means linking arms are pivotally attached to said supporting platform by adjustable pivot means.

7. An apparatus according to claim 5 wherein said moving means includes a constant speed electric motor connected to each side of said carriage mounting means by connecting means.

References Cited

UNITED STATES PATENTS

| | | | |
|---|---|---|---|
| 2,508,487 | 4/1950 | Bonnet | 95—18P |
| 2,492,520 | 12/1949 | Bonnet | 95—18P |
| 2,572,994 | 10/1951 | Dudley | 95—18P |
| 2,644,382 | 7/1953 | Ayres | 95—18P |
| 3,301,154 | 1/1967 | Stewart et al. | 95—18P |
| 2,400,455 | 4/1946 | Donaldson | 95—86 |

FOREIGN PATENTS

| | | | |
|---|---|---|---|
| 77048 | 7/1946 | Netherlands | 95—18P |
| 260,873 | 4/1949 | Switzerland | 95—18P |

SAMUEL S. MATTHEWS, Primary Examiner

D. J. CLEMENT, Assistant Examiner

U.S. Cl. X.R.

95—18R, 86